US009602624B2

(12) United States Patent
Davis

(10) Patent No.: US 9,602,624 B2
(45) Date of Patent: Mar. 21, 2017

(54) FACILITATING CONTENT MANAGEMENT BASED ON PROFILES OF MEMBERS IN AN ENVIRONMENT

(71) Applicant: AT&T Intellectual Property I, LP, Atlanta, GA (US)

(72) Inventor: Braxton Davis, Atlanta, GA (US)

(73) Assignee: AT&T INTELLECTUAL PROPERTY I, L.L.P., Atlanta, GA (US)

( * ) Notice: Subject to any disclaimer, the term of this patent is extended or adjusted under 35 U.S.C. 154(b) by 234 days.

(21) Appl. No.: 14/042,158

(22) Filed: Sep. 30, 2013

(65) Prior Publication Data
US 2015/0095418 A1 Apr. 2, 2015

(51) Int. Cl.
G06F 15/16 (2006.01)
H04L 29/08 (2006.01)
(Continued)

(52) U.S. Cl.
CPC ....... *H04L 67/306* (2013.01); *B60H 1/00064* (2013.01); *B60R 21/01536* (2014.10);
(Continued)

(58) Field of Classification Search
USPC ............ 709/204; 62/157; 165/203; 236/1 B; 455/415, 553.1, 161.1; 701/48; 340/438,
(Continued)

(56) References Cited

U.S. PATENT DOCUMENTS 5,691,848 A 11/1997 Van et al.
6,122,580 A 9/2000 Autermann
(Continued)

FOREIGN PATENT DOCUMENTS

EP 392411 B2 1/1999
JP 2060856 A 3/1990
(Continued)

OTHER PUBLICATIONS

Diewald, et al., "Mobile Device Integration and Interaction in the Automotive Domain." AutoNUI: Automotive Natural User Interfaces Workshop at the 3rd International Conference on Automotive User Interfaces and Interactive Vehicular Applications (AutomotiveUI 2011). 2011. https://vmi.lmt.ei.tum.de/publications/2011/AutoNUI_Mobile_Device_Integration.pdf Retrieved on Sep. 7, 2013, 4 pages.
(Continued)

*Primary Examiner* — Kyung H Shin
(74) *Attorney, Agent, or Firm* — Amin, Turocy & Watson, LLP

(57) ABSTRACT

Concurrent provisioning of preferences for members of an environment is facilitated. A method identifies a characteristic of an environment, wherein the characteristic is based on profile information associated with entities in the environment. The method also determines control information associated with providing preferences associated with the characteristic. In another case, an apparatus stores first profile information for a first entity, wherein the first profile information is configured to be evaluated, along with second profile information associated with a second entity, by a receiving device in an environment. In another case, an apparatus retrieves, from a device in an environment, profile information associated with entities in the environment. The apparatus can determine support care based on the profile information.

20 Claims, 17 Drawing Sheets

(51) Int. Cl.
*B60R 21/015* (2006.01)
*G06Q 30/04* (2012.01)
*G08G 1/0968* (2006.01)
*G06Q 30/06* (2012.01)
*B60H 1/00* (2006.01)
*G06F 17/27* (2006.01)
*H04H 60/65* (2008.01)

(52) U.S. Cl.
CPC ........... *G06F 17/274* (2013.01); *G06Q 30/04* (2013.01); *G06Q 30/0641* (2013.01); *G08G 1/096888* (2013.01); *H04H 60/65* (2013.01); *H04L 67/18* (2013.01)

(58) Field of Classification Search
USPC .................. 340/443, 449, 435, 436, 901
See application file for complete search history.

(56) References Cited

U.S. PATENT DOCUMENTS

| | | | |
|---|---|---|---|
| 6,161,071 A * | 12/2000 | Shuman | G08G 1/096888 340/436 |
| 6,584,389 B1 | 6/2003 | Reimann et al. | |
| 6,748,237 B1 * | 6/2004 | Bates | H04H 60/65 455/161.1 |
| 6,945,060 B2 * | 9/2005 | Tomita | B60H 1/00064 165/203 |
| 7,228,213 B2 | 6/2007 | Sakai et al. | |
| 7,653,467 B2 | 1/2010 | Bachmann et al. | |
| 8,326,259 B2 | 12/2012 | Gautama et al. | |
| 8,527,146 B1 | 9/2013 | Jackson et al. | |
| 2002/0081984 A1 | 6/2002 | Liu | |
| 2004/0183284 A1 | 9/2004 | Jitsui et al. | |
| 2007/0207789 A1 * | 9/2007 | Zellner | G06Q 30/04 455/415 |
| 2007/0238491 A1 | 10/2007 | He | |
| 2008/0036580 A1 * | 2/2008 | Breed | B60R 21/01536 340/438 |
| 2008/0215209 A1 | 9/2008 | Ikeda et al. | |
| 2009/0144622 A1 | 6/2009 | Evans et al. | |
| 2009/0248244 A1 | 10/2009 | Sumimoto et al. | |
| 2010/0121536 A1 | 5/2010 | Wang et al. | |
| 2011/0115606 A1 | 5/2011 | Fu et al. | |
| 2011/0137520 A1 | 6/2011 | Rector et al. | |
| 2011/0137757 A1 * | 6/2011 | Paolini | G06Q 30/0641 705/27.1 |
| 2011/0187499 A1 | 8/2011 | Mueller | |
| 2011/0270492 A1 | 11/2011 | Hwang et al. | |
| 2013/0047099 A1 * | 2/2013 | Markman | G06F 17/274 715/758 |
| 2013/0144462 A1 | 6/2013 | Ricci | |
| 2013/0226371 A1 | 8/2013 | Rovik et al. | |

FOREIGN PATENT DOCUMENTS

| | | |
|---|---|---|
| JP | 2003237504 A | 8/2003 |
| JP | 2004106685 A | 4/2004 |
| KR | 20060135806 | 12/2006 |
| KR | 20110034155 | 4/2011 |

OTHER PUBLICATIONS

Dodson, et al., "Micro-Interactions with NFC-Enabled Mobile Phones." Mobile Computing, Applications, and Services. Springer Berlin Heidelberg, 2012. 118-136. http://mobisocial.stanford.edu/papers/mobicase11.pdf. Retrieved on Sep. 7, 2013, 20 pages.

Moritz, et al., "Seamless Mobility: Individual Mobility Profiles for a Better Usability of Shared Vehicles." HCI International 2013—Posters Extended Abstracts. Springer Berlin Heidelberg, 2013. 318-322. http://link.springer.com/chapter/10.1007/978-3-642-39476-8_65. Retrieved on Sep. 7, 2013, 4 pages.

* cited by examiner

FACILITATING CONTENT MANAGEMENT BASED ON PROFILES OF MEMBERS IN AN ENVIRONMENT

TECHNICAL FIELD

The subject disclosure relates generally to information processing, and specifically to facilitating content management based on profiles of members in an environment.

DETAILED DESCRIPTION

Figure 1:
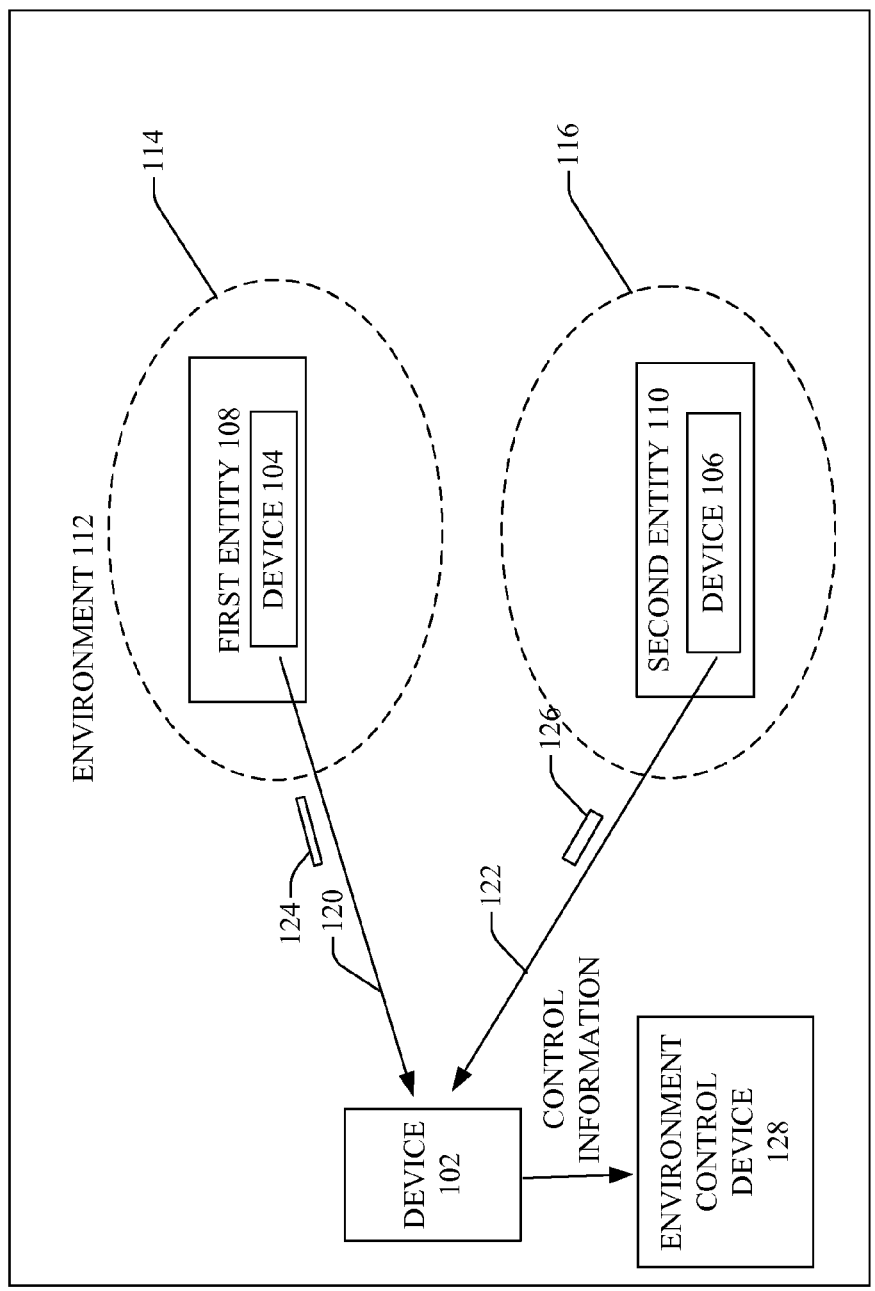
FIG. 1 illustrates an example block diagram of a system facilitating content management based on profiles of members in an environment in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (femto cell device)," "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the term "femto" and "femto cell" are used interchangeably, and the terms "macro" and "macro cell" are used interchangeably.

Preferences and/or needs vary between different entities in a group setting within the same environment. However, due to deficiencies in technology and/or the relative power or influence of people within the environment, one or more preferences of a person in the environment may be overlooked, ignored or otherwise not served. In various embodiments, described herein, systems, methods and/or apparatus can tailor an environment to meet the needs of two or more entities in the environment. As used herein, the terms "entity" and "entities" can include humans, animals, machinery or any other body that can have associated preferences for a surrounding environment. For example, a human can have numerous preferences regarding characteristics of his/her environment, an owner of an animal can indicate preferences of an environment suitable for his/her pet and/or a laboratory technician can indicate preferences of an environment suitable for specific types of machinery.

In other cases, dissemination and/or retrieval of information about entities in an environment can be critical to efficiently determining proper support resources for medical care. As described herein, embodiments are provided that allow for critical dissemination of information and determinations regarding support care.

Embodiments described herein can be employed in a number of different types of environments, including, but not limited to, motor vehicles (e.g., connected cars, conventional cars, emergency vehicles, airplanes), residential or business properties, public transportation or the like. In various embodiments, devices that can store profile information can be devices that are stationary or mobile (e.g., mobile telephone). The embodiments can effectively generate, control and/or disseminate information based on status, need, age, or other factors to tailor environments to those in the environment.

Specifically, systems, methods, apparatus and/or computer-readable storage media described herein facilitate content management based on profiles of members in an environment. In one embodiment, a method includes: identifying, by a first device comprising a processor, a defined characteristic of an environment, wherein the defined characteristic is based on profile information associated with entities in the environment; and determining, by the first device, control information associated with providing preferences associated with the defined characteristic to the entities in the environment.

In another embodiment, an apparatus includes: a memory to store executable instructions; and a processor, coupled to the memory, that facilitates execution of the executable instructions to perform operations. The operations include: retrieving from a first device in an environment, profile information associated with entities in the environment; and determining support care based on the profile information associated with the entities.

In another embodiment, another apparatus includes: a memory to store executable instructions; and a processor, coupled to the memory, that facilitates execution of the executable instructions to perform operations. The operations include: storing first profile information for a first entity, wherein the first profile information is configured to be evaluated, along with second profile information associated with a second entity, by a receiving device in an environment for concurrent provisioning of preferences within the environment. The operations can also include transmitting the first profile information to the receiving device.

One or more embodiments can advantageously tailor an environment to accommodate multiple preferences of entities within the environment and thereby increase comfort and quality of user experience. In various embodiments, one or more embodiments can advantageously improve quality of care by allowing retrieval of profile information and corresponding efficient determination of resources (e.g., medical equipment, dispatch of emergency personnel) to support care of entities associated with the profile information.

Turning now to the drawings, FIG. 1 illustrates an example block diagram of a system facilitating content management based on profiles of members in an environment in accordance with one or more embodiments described herein. System 100 can include device 102 and devices 104, 106 associated with first entity 108 and second entity 110, respectively. Devices 102, 104, 106 are located in environment 112 and first region 114 of environment 112 corresponds to a geographical region proximate to first entity 108 and second region 116 of environment 112 corresponds to a geographical region proximate to second entity 110.

Devices 102, 104, 106 can be electrically and/or communicatively coupled to one another in various embodiments to facilitate performance of one or more functions of system 100 and/or device 102. For example, in some embodiments, devices 102 and 104 can be communicatively coupled to one another via wireless channel 120, and devices 102 and 104 can be communicatively coupled to one another via wireless channel 122. In other embodiments, the channels between device 102 and 104 and/or between device 102 and 106 can be based on inductive coupling between the devices. In yet other embodiments, the channels between device 102 and 104 and/or between device 102 and 106 can be channels formed based on based on RFID communication, near field communication or the like.

Devices 102, 104, 106 can be any devices, including software, hardware or a combination of hardware and software, configured to facilitating content management based on profiles of members in an environment. For example, device 102 can be any device that can transmit and/or receive information to and/or from an entity or device associated with the entity. In various embodiments, device 102 can determine one or more preferences of a defined characteristic associated with environment 112 based on profile information stored at and retrieved from devices 104, 106, determine control information for providing one or more preferences to multiple entities or the like.

Devices 104, 106 can be any devices that can store and/or transmit profile information about respective entities with which devices 104, 106 are associated. The profile information can include, but is not limited to, biographical information about the entity (e.g., name, address, age, gender, telephone number, emergency contact information), medical history or condition of the entity (e.g., diabetic, blood type O) and/or preferences of the entity (e.g., temperature preference of 75 degrees, broadcast radio station preference of hard rock, vehicle seat preference of 45 degree angle, ventilation preference of air directed away from entity).

In various embodiments, devices 104, 106 can be or be electrically coupled to a mobile device. The mobile device can be a smart phone, key fob or a laptop, for example. In some embodiments, devices 104, 106 can be a radio frequency identification device (RFID) component (e.g. RFID tag) or the like. The RFID component can be attached to the clothing of an entity for example. In this regard, device 104 is coupled to, carried by or otherwise associated with first entity 108, and device 106 is coupled to, carried by or otherwise associated with second entity 110. As such, in some embodiments, device 102 can detect the presence of first entity 108 by detection of a signal from device 104 and/or device 102 can detect the presence of second entity 110 by detection of a signal from device 106.

While the embodiments described herein devices 104, 106 for storing and/or transmitting and/or allowing retrieval of profile information from, in some embodiments, device 102 can store profile information previously-retrieved.

Further, in some of these embodiments, biometric or other information can be obtained from first entity 108 and/or second entity 110 to access the previously-stored profile information for first entity 108 and/or second entity 110, respectively. For example, the identity of an entity in an environment can be verified based on biometrics (e.g., facial recognition, iris scan, fingerprint scan), visual information or voice information provided by the entity to device 102. Upon confirming the identity of the entity, device 102 can utilize previously-stored profile information for the entity.

In some embodiments, device 102 can determine an identity of an entity and dispense information to entity. For example, in some embodiments, device 102 can be included as part of a component of a public transportation vehicle (e.g., window of a passenger train). Device 102 can output information to the entity via any number of different methods. In some cases, device 102 includes structure for inputting information into the brain/mind of entity. The information can include, but is not limited to, alerts, advertisements or the like. In some embodiments, the alerts can be based on profile information.

In various embodiments, device 102 can access first profile information 124 associated with first entity 108 and second profile information 126 associated with second entity 110. As described, the first and second profile information can be retrieved or received from first entity 108 and second entity 110, respectively. In other embodiments, the first and second profile information can be previously-stored at device 102. For simplicity in explanation, two entities (e.g., first entity 108 and second entity 110) are employed for the embodiments described herein. However, the embodiments described herein can employ the systems, apparatus and methods described with any number of different entities.

After accessing the profile information for one or more of the entities in environment 112, device 102 can determine one or more preferences of characteristics of environment 112. Device 102 can then generate control information for concurrently providing a comfortable environment for first entity 108 and second entity 110 within environment 112 aligned with one or more preferences of first entity 108 and second entity 110.

In various embodiments, the control information can be provided to environment control device 128. Environment control device 128 can be a device (or numerous different components or systems) within environment 112 that can affect change in environment 112 based on the control information generated by device 102. For example, in some embodiments, environment control device 128 can be a device, system, software or circuitry configured to provide a defined air temperature as air conditioning within first region 114 or second region 116. In another embodiment, environment control device 128 can be an audio device that can output a defined volume to first region 114 and/or to second region 116.

Figure 3:
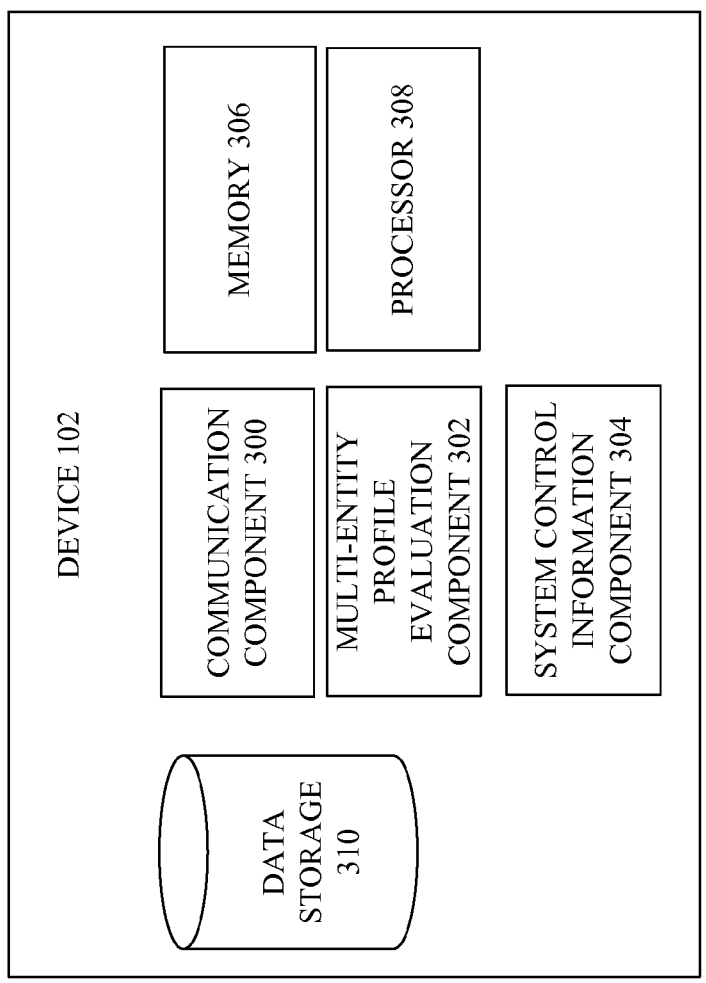
FIG. 3 illustrates an example block diagram of a device that can facilitate content management based on profiles of members in an environment in accordance with one or more embodiments described herein.
Figure 4:
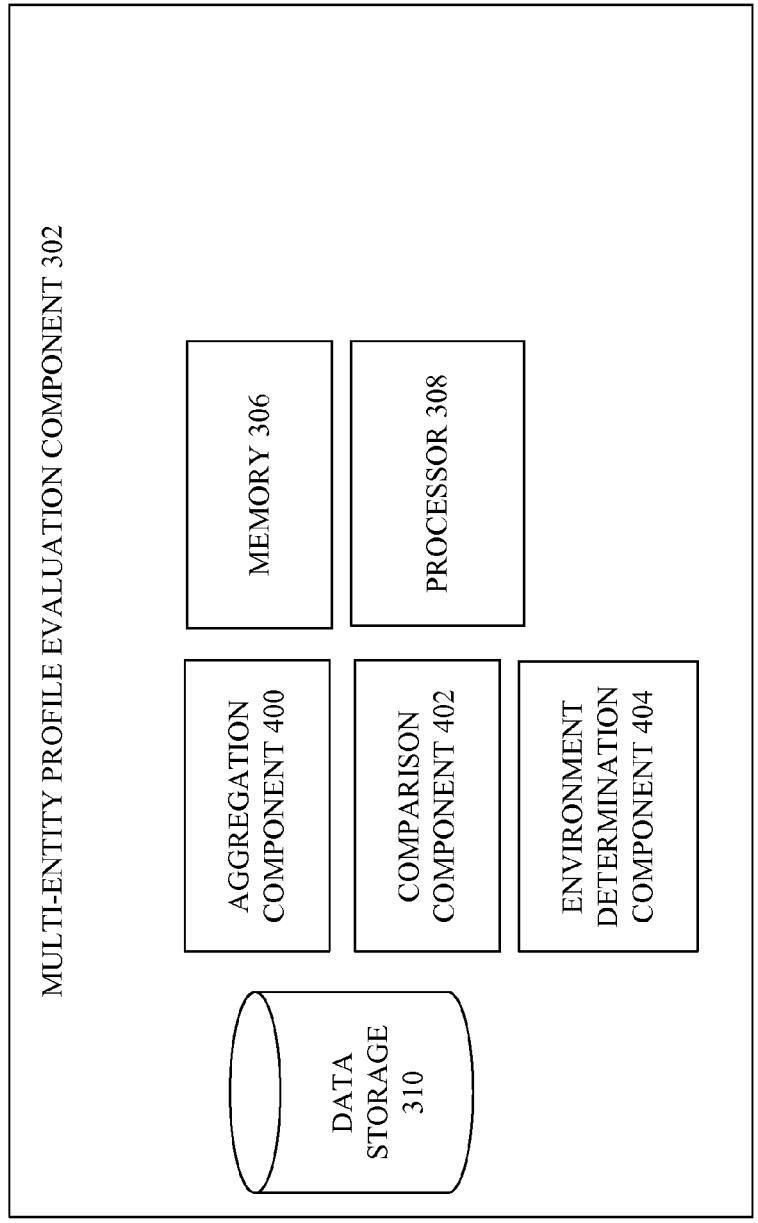
FIG. 4 illustrates an example block diagram of a multi-entity profile evaluation component of the device of FIG. 3 in accordance with one or more embodiments described herein.
Figure 5:
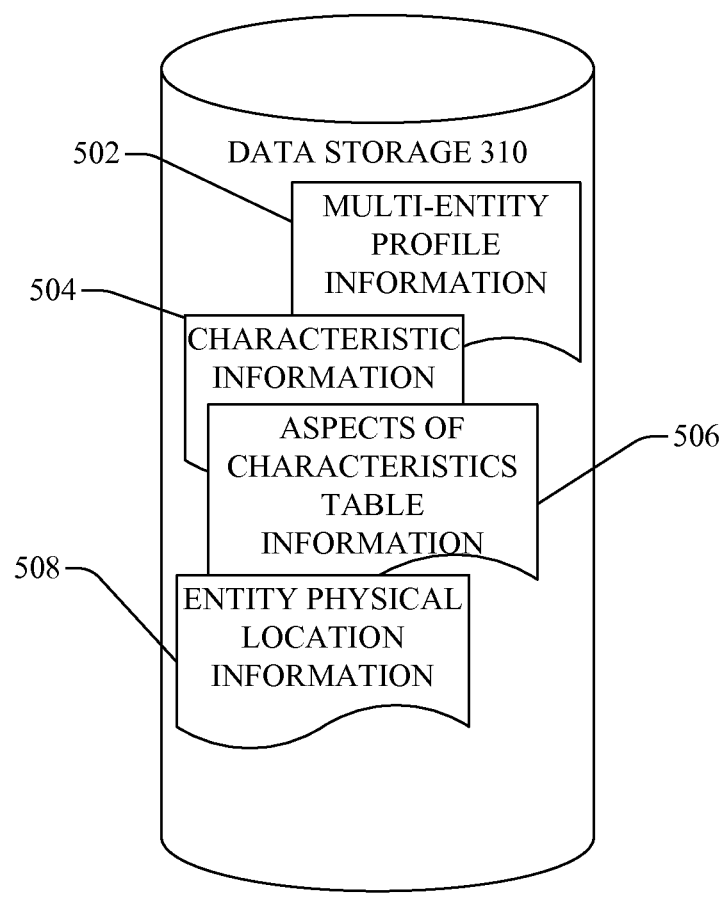
FIG. 5 illustrates an example block diagram of data storage of the device of FIG. 3 in accordance with one or more embodiments described herein.

Device 102 will be described in greater detail with reference to FIGS. 3, 4 and 5. FIG. 3 illustrates an example block diagram of a device that can facilitate content management based on profiles of members in an environment in accordance with one or more embodiments described herein. FIG. 4 illustrates an example block diagram of a multi-entity profile evaluation component of the device of FIG. 3 in accordance with one or more embodiments described herein. FIG. 5 illustrates an example block diagram of data storage of the device of FIG. 3 in accordance with one or more embodiments described herein. Repetitive description of like elements employed in respective embodiments of systems and/or apparatus described herein are omitted for sake of brevity.

Turning first to FIG. 3, device 102 can include communication component 300, multi-entity profile evaluation component 302, system control information component 304, memory 306, processor 308 and/or data storage 310. In various embodiments, one or more of communication component 300, multi-entity profile evaluation component 302, system control information component 304, memory 306, processor 308 and/or data storage 310 can be electrically and/or communicatively coupled to one another to perform one or more functions of device 102.

Communication component 300 can transmit and/or receive information from and/or at device 102. For example, in various embodiments, communication component 300 can transmit and/or receive any of a number of different types of information including, but not limited to, images, voice, video, text, data or the like. In various embodiments, the information transmitted and/or received can be profile information from devices 104, 106 from first entity 108 and second entity 110.

Multi-entity profile evaluation component 302 can be configured to evaluate profile information received from various entities in environment 112. Multi-entity profile evaluation component 302 can then generate control information for concurrently providing the same or different preferences to first entity 108 and to second entity 110 within environment 112.

Multi-entity profile evaluation component 302 can include one or more components or functions described with reference to FIG. 4 and/or FIG. 1. Turning now to FIG. 4, shown is an example block diagram of multi-entity profile evaluation component 302 of device 102. Repetitive description of like elements employed in respective embodiments of systems and/or apparatus described herein are omitted for sake of brevity.

Multi-entity profile evaluation component 302 can include aggregation component 400, comparison component 402, environment determination component 404, memory 306, processor 308 and/or data storage 310. In various embodiments, aggregation component 400, comparison component 402, environment determination component 404, memory 306, processor 308 and/or data storage 310 can be electrically or communicatively coupled to perform one or more functions of multi-entity profile evaluation component 302. Repetitive description of like elements employed in respective embodiments of systems and/or apparatus described herein are omitted for sake of brevity.

With reference to FIGS. 1 and 4, aggregation component 400 can aggregate one or more portions or types of profile information for two or more different entities. In one embodiment, aggregation component 400 can aggregate one or more portions or types of profile information for a single entity.

In some embodiments, aggregation component 400 can identify or obtain from profile information from first entity 108 or second entity 110, information indicative of a specific characteristic of environment 112. The characteristic can include, but is not limited to, temperature, volume of audio, brightness of light, amount of sun exposure, broadcast radio station or the like. For example, for first entity 108, characteristics can relate to first region 114 of environment 112 while, for second entity 110, characteristics can relate to second region 116 of environment 112. Various characteristics of environment 112 that can be controlled electrically, mechanically and/or chemically can be employed in embodiments described herein.

In some embodiments, aggregation component 400 can aggregate, sort, rank and/or categorize preference information about a characteristic. For example, aggregation component 400 can identify temperature as a characteristic for both first entity 108 and second entity 110. Aggregation component 400 can also aggregate information indicative of a preference for temperature for first entity 108 and information indicative of a preference for temperature for second entity 110.

Comparison component 402 can compare the information indicative of the preferences for first entity 108 and second entity 110. Comparison component 402 can generate information indicative of whether the preferences for first entity 108 and second entity 110 are the same or different.

Environment determination component 404 can determine control information associated with providing preferences of the specific characteristic to the first entity 108 and the second entity 110. For example, in one embodiment, the profile information associated with first entity 108 and second entity 110 includes first profile information 124 associated with first entity 108, and second profile information 126 associated with second entity of the plurality of entities 110.

In various embodiments, environment determination component 404 can perform one or more evaluations and/or generate corresponding control information associated with tailoring the environment to preferences and/or to biological information of first entity 108 and second entity 110. In various embodiments, control information can include information such as a specific temperature for first region 114 at which first entity 108 is located, a specific temperature for second region 116 at which second entity 110 is located, location coordinates of first region 114 and second region 116 (absolute or relative to one another) or the like.

In some embodiments, for example, comparison component 402 can determine that first profile information 124 and second profile information 126 indicate the same preference for a particular characteristic and/or the value of the actual preferences. For example, if first entity 108 and second entity each prefer a jazz broadcast radio station, broadcast radio station is the characteristic and the preference is jazz. In other embodiments, the preference can be any number of different genres of broadcast radio stations. Since environment determination component 404 determines that the broadcast radio station preference is identical for first entity 108 and second entity 110, environment determination component 404 can determine information associated with concurrently providing the jazz station to first entity 108 and second entity 110 across first region 114 and second region 116 within environment 112. As described above, two entities are used for simplicity in explanation. However preferences can be provided for any number of entities concurrently. For example, two entities can be provided the same temperature while a third entity in the environment can be provided a different temperature.

In another example, comparison component 402 can determine that first profile information 124 and second profile information 126 indicate distinct preferences for a characteristic and/or determine actual values of the preferences. For example, environment determination component 404 can determine that both first entity 108 and second entity 110 have profile information that include details regarding a preferred temperature, notwithstanding preferences for the actual preferred temperature differ. Environment determination component 404 can determine information associated with concurrently providing the first preference (e.g., the temperature preferred by first entity 108) to first entity 108, and providing the second preference (e.g., the temperature preferred by second entity 110) to second entity 110. Accordingly, both first entity 108 and second entity 110 are in environment 112 and environment determination component 404 can provide different temperature conditions to first entity 108 and second entity 110 for individualized comfort.

By way of example, but not limitation, in addition to determining the specific temperature for first entity 108 and the specific temperature for second entity 110, environment determination component 404 can generate information for provisioning the respective temperatures in regions associated with the physical preference of first entity 108 and second entity 110. For example, environment determination component 404 can generate information for first entity 108 that includes a temperature to provide to first entity 108 and a geographical region within environment 112 in which to provide the temperature. In one example, the geographical region for first entity can be the region indicated by first region 114 of environment 112 while the geographical region for second entity can be the region indicated by second region 116 of environment 112. Environment determination component 404 can generate information for causing at least a portion of first region 114 and/or second region 116 to have temperatures associated with the profile information for first entity 108 and second entity 110, respectively.

Different temperatures can be provided to first entity 108 and second entity 110 in various different ways including, but not limited to, adjusting a level of sun tint on a window within the region of environment 112. For example, a window within first region 114 and/or a window within second region 116 can be dynamically controlled to have a defined amount of tint to shield the sun from first entity 108 and/or second entity 110 (and correspondingly adjust the temperature to that which is indicated in the profile information for the entity). In some embodiments, the temperature provided can be within a range (e.g., +/−5 degrees) of the preferred temperature specified in the profile information of the particular entity.

In another embodiment, the air temperature or amount of air conditioning provided in or directed towards first region 114 and/or second region 116 can differ to achieve a first preferred temperature in first region 114 and/or a second preferred temperature in second region 116.

In another example, the characteristic can be volume of audio within environment 112. A first volume can be provided via audio speakers configured to provide audio in first region 114 and a second volume can be provided via audio speakers configured to provided audio in second region 116.

Accordingly, in embodiments in which the nature of the characteristic identified from the profile information is such that the characteristic can be concurrently provided in different geographical regions to the different entities, environment determination component 404 can concurrently provide the preferences of the characteristic to respective entities.

In another example, comparison component 402 can determine that first profile information 124 and second profile information 126 indicate distinct preferences of a particular characteristic and/or determine the specific preferences. In this embodiment, environment determination component 404 can determine that the characteristic or size of (or other quality of) environment 112 is such that providing the characteristic in different regions associated with first entity 108 and second entity 110 concurrently may not be feasible. Therefore, environment determination component 404 can determine information associated with alternately providing the first preference of a particular characteristic to first entity 108, and then providing the second preference of the particular characteristic to second entity 110 (or vice versa).

Environment determination component 404 can determine information for alternately providing the preferred preferences concurrently to both first entity 108 and second entity 110. For example, if first entity prefers jazz music to be played in environment 112, and second entity prefers hard rock music to be played in environment 112, environment determination component 404 can generate information for one or more jazz songs to be played concurrently within first region 114 and second region 116, and then one or more hard rock songs to be played concurrently within first region 114 and second region 116 (or vice versa).

In another example, comparison component 402 can determine that first profile information 124 and second profile information 126 indicate distinct preferences of a specific characteristic and/or the preferences. For example, environment determination component 404 can determine that both first entity 108 and second entity 110 have profile information that include details regarding a preferred broadcasting station, notwithstanding preferences for the actual preferred broadcasting station differ. Environment determination component 404 can determine that an incompatibility exists between the preference of the first entity and biographical information associated with the second entity. For example, a characteristic of the second entity can be age less than 10 while first entity 108 may have a preference for a broadcasting station playing songs having subject matter or content inappropriate for entities less than 10 years of age. As such, in some embodiments, environment determination component 404 can select a broadcasting station preferred by second entity 110 to be concurrently provided to first entity 108 and second entity 110 in some embodiments. In other embodiments, environment determination component 404 can select a third broadcasting station that may be amenable to and appropriate for first entity 108 and second entity 110.

Accordingly, in various embodiments, environment determination component 404 can determine that a characteristic cannot be effectively isolated to region 112 for first entity 108 and to region 114 for second entity 110 and thus determine a suitable compromise. For example, sound of broadcasting station cannot be effectively isolated in some cases in which there is an incompatibility between the biographical information of an entity and the preference of another entity. However, in other embodiments in which no incompatibility with biographical information exists, different broadcasting stations can be provided at suitable volumes and in suitable regions associated with the respective entities concurrently.

Turning back to FIGS. 1 and 3, system control information component 304 can format information generated by multi-entity profile evaluation component 302 to be received and processed by environment control device 128 of environment 112. Information formatted by system control information component 304 can be employed to effect changes in the environment in first region and second region to tailor preferences to the geographical region in which the entity is located within environment 112.

Memory 306 can be a computer-readable storage medium storing computer-executable instructions and/or information for performing the functions described herein with reference to device 102, multi-entity profile evaluation component 302 and/or system control information component 304 (or any component of device 102, multi-entity profile evaluation component 302 or system control information component 304). For example, memory 306 can store computer-executable instructions that can be executed by processor 308 to perform communication, evaluation, decision-making or other types of functions executed by device 102, multi-entity profile evaluation component 302 and/or system control information component 304. Processor 308 can perform one or more of the functions described herein with reference to device 102 (or any component thereof, including multi-entity profile evaluation component 302 and/or system control information component 304). For example, processor 308 can evaluate profile information (e.g., age, identity, preferences), defined characteristics (e.g., temperature, broadcast station, seat adjustment, ventilation) based on the profile information, preferences of the defined characteristics (e.g., air temperature of approximately 75 degrees, air temperature of approximately 68 degrees, classical music broadcast station, rhythm and blues broadcast station). Any number of different functions described herein for facilitating content management based on profiles of members in an environment can be performed utilizing processor 308.

Data storage 310 can be described in greater detail with reference to FIG. 5. FIG. 5 illustrates an example block diagram of data storage of the device of FIG. 3 in accordance with one or more embodiments described herein. As shown, data storage 310 can be configured to store information accessed by, received by and/or processed by device 102, multi-entity profile evaluation component 302 and/or system control information component 304. For example, data storage 310 can store multi-entity profile information 502 such as information about numerous entities in the same environment. By way of example, but not limitation, the profile information for one or more of the entities can include information such as an identity of the entity, age of the entity, medical information (e.g., blood type, diabetic history, heart disease history), environmental preferences (e.g., temperature of environment, ventilation setting in environment, broadcast station within environment).

In various embodiments, data report information 502 can also include characteristic information 504. Characteristic information can include a set of characteristics for the environment. The characteristics can differ depending on the type of the environment. For example, characteristics for a vehicle environment can include, but are not limited to, temperature, broadcast station, ventilation setting and seat adjustment while characteristics for a home environment can include, but are not limited to, lighting, temperature, wireless communication connectivity.

As another example, data storage 310 can store preferences of characteristics table information 504. The preferences of characteristics table information 504 can include a table of possible values for the characteristic information 504. For example, for lighting, preferences of characteristics table information 504 can include low light and bright light. For, temperature, preferences of characteristics table information 504 can include 80 degrees, 75 degrees or 68 degrees.

As another example, data storage 310 can store entity physical location information 508. Entity physical location information 508 can include information about the physical location of one or more entities within an environment. Accordingly, the physical location can be updated if the entity moves to a new location within the environment. As an example, the physical location for a first entity can be a driver's seat of a vehicle when the vehicle is the environment whereas the physical location for the second entity can be the right back seat or the passenger seat. As another example, the physical location for a first entity in a residence can be the first floor while the physical location for the second entity in a residence can be the second floor.

Figure 6:
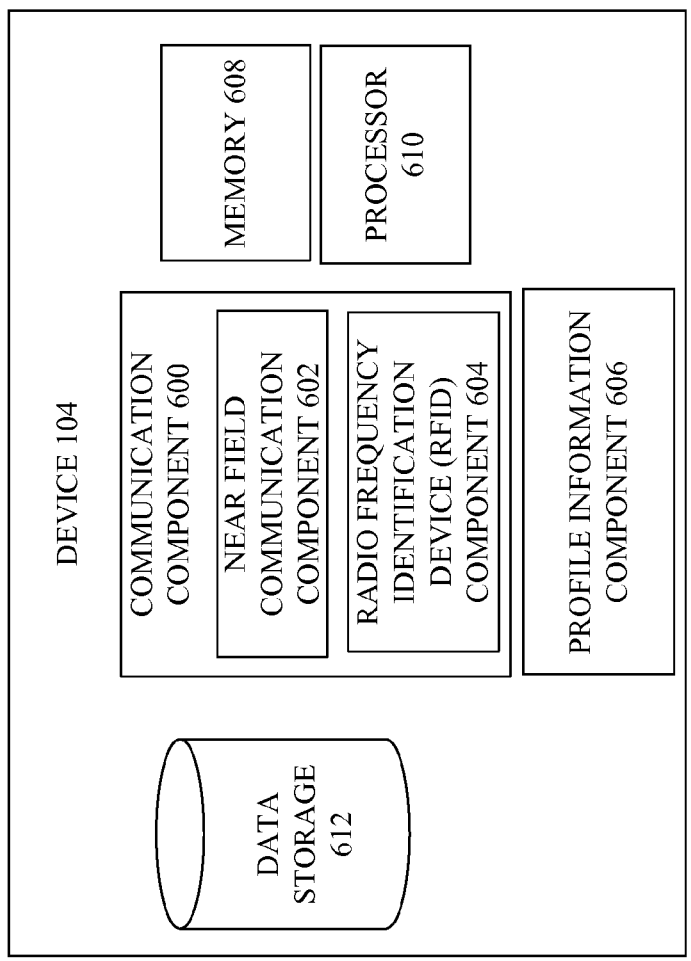
FIG. 6 illustrates an example block diagram of a device that can be employed to facilitate content management based on profiles of members in an environment in accordance with one or more embodiments described herein.

FIG. 6 illustrates an example block diagram of another device that can be employed to facilitate content management based on profiles of members in an environment in accordance with one or more embodiments described herein. Repetitive description of like elements employed in respective embodiments of systems and/or apparatus described herein are omitted for sake of brevity.

In various embodiments, as described with reference to FIG. 1, device 104 can store profile information for an entity within an environment. The profile information can be accessed by device 102 in various embodiments. For example, with reference to device 104 can store profile information for first entity 108 within environment 112.

As shown, in some embodiments, device 104 can include communication component 600, profile information component 606, memory 608, processor 610 and/or data storage 612. In various embodiments, one or more of communication component 600, profile information component 606, memory 608, processor 610 and/or data storage 612 can be electrically and/or communicatively coupled to one another to perform one or more functions of device 104.

Communication component 600 can transmit and/or receive information from and/or at device 104. For example, in various embodiments, communication component 600 can transmit and/or receive profile information to and/or from device 102. In various embodiments, communication component 600 can transmit and/or receive information in any number of different ways including, but not limited to, via conventional wireless channels via a transceiver configured to communicate over wireless channels.

In other embodiments, communication component 600 can include near field communication component 602 configured to provide communication between near field communication component 602 and a component in device 104 to which near field communication component 602 can be inductively coupled for transfer of the profile information.

In some embodiments, communication component 600 can include RFID component 604. For example, RFID component 604 can be or include an RFID tag that can be read by an RFID reader in device 102. Profile information stored on RFID component 604 can be read by RFID reader in device 102.

Profile information component 602 can format, process, generate and/or transmit profile information for the entity with which device 104 is associated. By way of example, but not limitation, profile information can include biographical information for an entity and/or one or more characteristics for the entity. Profile information can be stored in data storage 612.

Memory 608 can be a computer-readable storage medium storing computer-executable instructions and/or information for performing the functions described herein with reference to device 104 and/or profile information component 606. For example, memory 608 can store computer-executable instructions that can be executed by processor 610 to perform communication, evaluation, decision-making or other types of functions executed by device 104 and/or profile information component 606. Processor 610 can perform one or more of the functions described herein with reference to device 104 and/or profile information component 606. For example, processor 610 can format, process and/or generate profile information (e.g., age, identity, preferences) and/or defined characteristics (e.g., temperature, broadcast station, seat adjustment, ventilation) of an entity associated with device 104.

Figure 7:
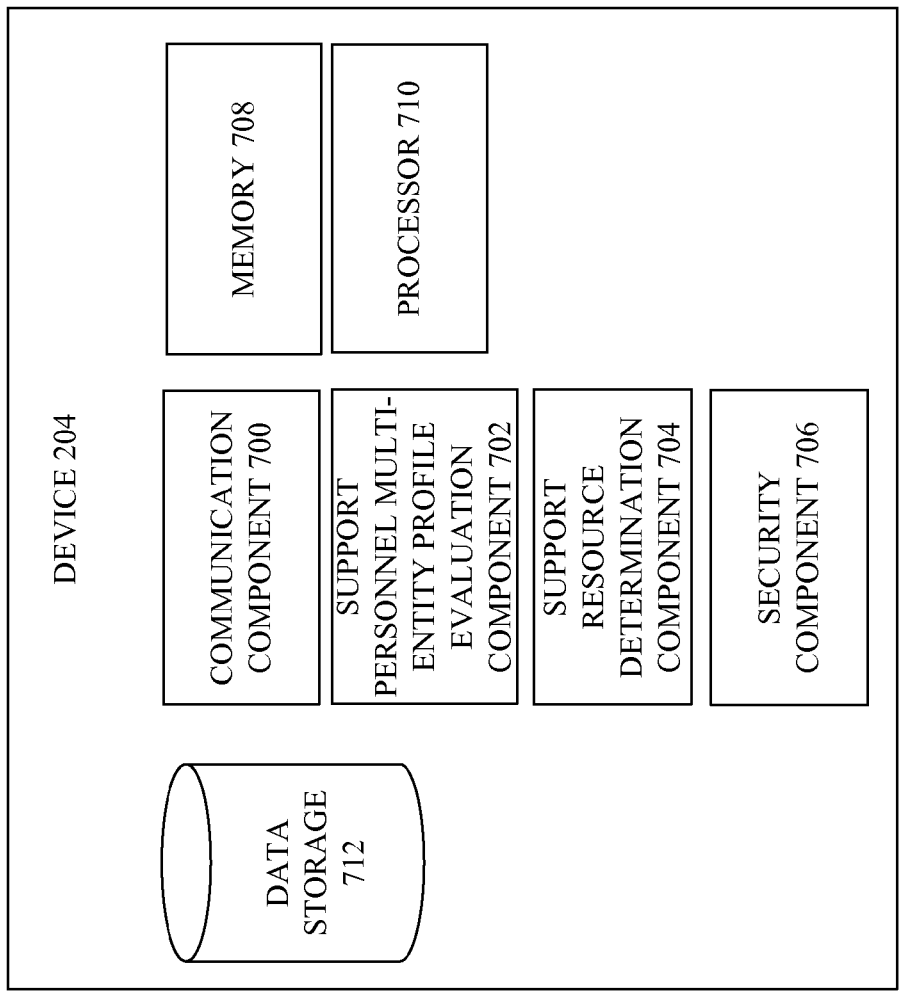
FIG. 7 illustrates an example block diagram of a device that can facilitate content management based on profiles of members in an environment in accordance with one or more embodiments described herein.

FIG. 7 illustrates an example block diagram of a device that can facilitate content management based on profiles of members in an environment in accordance with one or more embodiments described herein. Repetitive description of like elements employed in respective embodiments of systems and/or apparatus described herein are omitted for sake of brevity.

Figure 2:
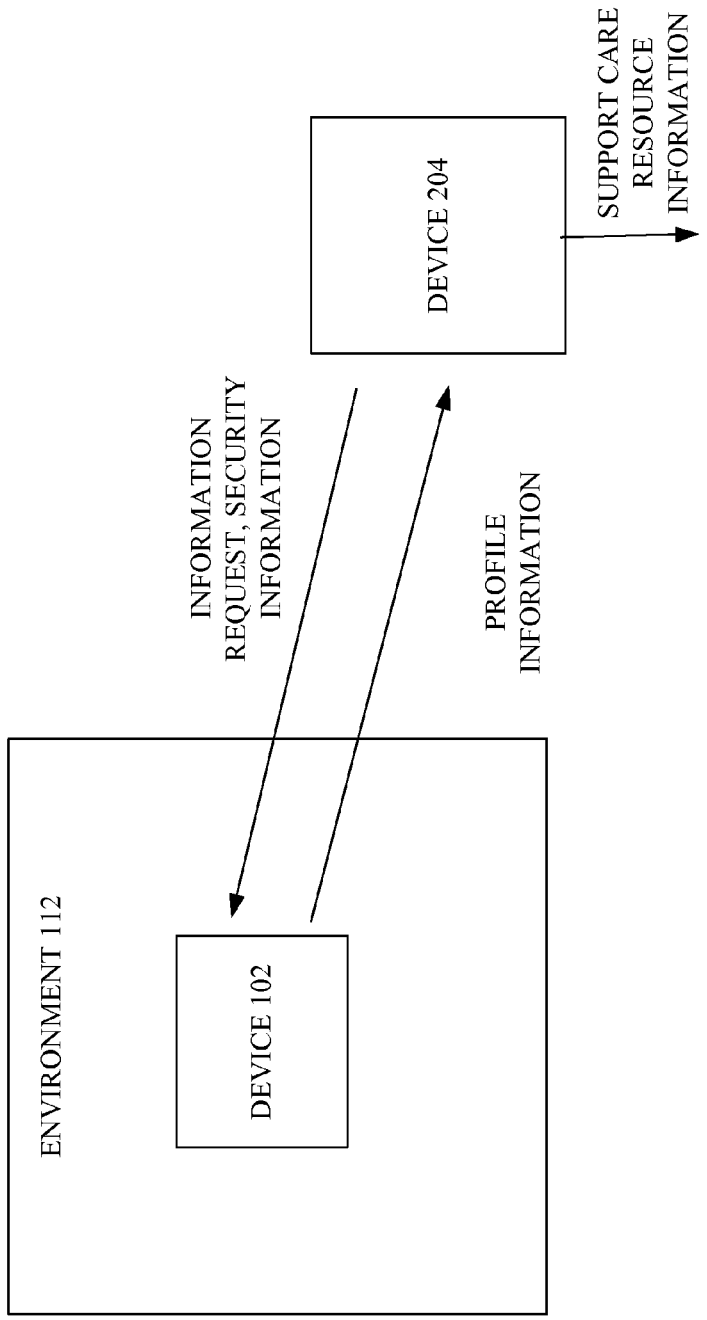
FIG. 2 illustrates an example block diagram of another system facilitating content management based on profiles of members in an environment in accordance with one or more embodiments described herein.

In various embodiments, as described with reference to FIG. 2, device 204 can retrieve, from device 102 (or from device 104 or device 106), profile information and/or information about identities of entities in an environment, a number of entities in an environment, biographical information about identifies in an environment or the like. For example, device 204 can be associated with support personnel (e.g., emergency care personnel) and can include structure and/or functionality for retrieving such information and/or determining resources needed for care of one or more entities prior to or at time of arrival at environment. For example, device 204 can be configured to evoke a response from device 102 that transmits information stored by device 102 and/or allows device 204 to access information stored in device 102. In this regard, device 102 can have a function similar to that of a black box in an airplane. An emergency telecommunications standard can allow device 204 to wirelessly access device 102, for example.

In various embodiments, the environment can be a vehicle (e.g., car accident) or home (e.g., fire). As such, device 204 can be employed to determine whether one or more entities associated with a burning home are still inside, whether one or more entities have been ejected from a car during car accident in which other entities are unconscious or the like.

Device 204 can include communication component 700, support personnel multi-entity profile evaluation component 702 support resource determination component 704, security component 706, memory 708, processor 710 and/or data storage 712. In various embodiments, one or more of communication component 700, support personnel multi-entity profile evaluation component 702 support resource determination component 704, security component 706, memory 708, processor 710 and/or data storage 712 can be electrically and/or communicatively coupled to one another to provide one or more functions of device 204.

Communication component 700 can transmit and/or receive information from and/or at device 204. For example, in various embodiments, communication component 700 can transmit authentication information generated and/or stored by security component 706 to device 102. Upon receipt of such information, device 102 can transmit profile information (e.g., name, age, blood type, medical conditions), information about the number or type of entities associated with the environment, to communication component 700. Support personnel multi-entity profile evaluation component 702 can evaluate the profile information received from device 102 and/or determine whether one or more entities are missing relative to those entities that may have been rescued by support personnel.

Support resource determination component 704 can determine one or more resources (e.g., medical equipment, type of personnel (fire, police, ambulance) needed) for providing support at the environment. In some embodiments, for example, support resource determination component 704 receives profile information and can determine a type of blood to transport or request at an accident scene prior to arrival, for example. In some embodiments, support resource determination component 704 can determine, prior to arrival, whether particular medications are likely to be needed prior to arrival, for example, based on medical condition information and/or biographical information (e.g., age, gender, health status) of one or more entities at the environment.

As such, device 204 can receive profile information wirelessly in some embodiments, from locations remote from the location of device 102. For example, device 204 and device 102 can communicate over wireless channels from great distances in some embodiments. As such, emergency resources (e.g., fire department, ambulance, jaws of life) can be dispatched sooner from information generated by device 204 based on the profile information retrieved from device 102. The profile information can be previously-stored prior to retrieval by device 204, for example.

In one embodiment, a family of three entities can be involved in an accident, for example, and one family member can be ejected from the vehicle. The vehicle is the environment in this case. Upon entering the vehicle, device 102 can retrieve profile information from each of the entities. Device 204 can receive and/or access profile information from device 102 and determine that at least one entity is missing from the vehicle. For example, if other entities are unconscious, device 204 can generate information to determine that a search should be started immediately for the missing entity.

In another embodiment, based on the profile information, upon vehicle impact with the object causing the accident, device 102 can communicate with and/or alert emergency personnel of information stored in the profile for one or more of the entities. For example, device 102 can transmit information to device 204 (or allow device 204 to access the information stored at device 102), or, in some embodiments, device 102 can transmit an alert regarding the accident and the profile information directly to the emergency personnel. Information transmitted can be various health-related information such as the status of one of the entities as a hemophiliac with type O blood. For baby or toddler entities, profile information can be retrieved from devices (e.g., devices 104, 106) built into or otherwise coupled to or associated with a car seat for the baby or toddler entity.

Memory 708 can be a computer-readable storage medium storing computer-executable instructions and/or information for performing the functions described herein with reference to device 204, support personnel multi-entity profile evaluation component 702, support resource determination component 704 and/or security component 706. For example, memory 708 can store computer-executable instructions that can be executed by processor 710 to perform communication, evaluation, decision-making or other types of functions executed by device 204, support personnel multi-entity profile evaluation component 702, support resource determination component 704 and/or security component 706. Processor 710 can perform one or more of the functions described herein with reference to device 204, support personnel multi-entity profile evaluation component 702, support resource determination component 704 and/or security component 706.

Figure 8:
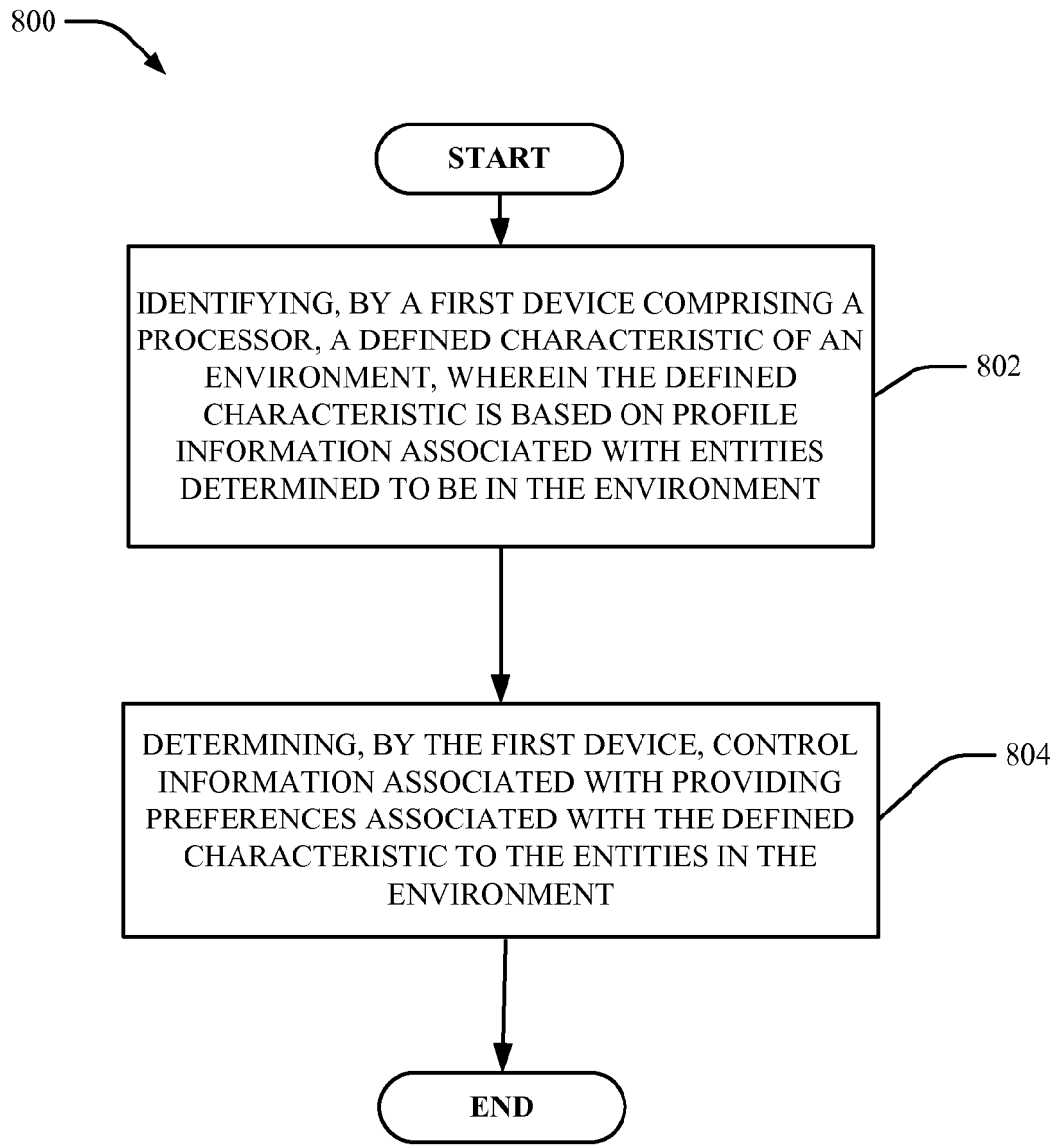
FIGS. 8-16 illustrate example flowcharts of methods that facilitate content management based on profiles of members in an environment in accordance with one or more embodiments described herein.

FIGS. 8-16 illustrate example flowcharts of methods that facilitate content management based on profiles of members in an environment in accordance with one or more embodiments described herein. Turning first to FIG. 8, at 802, method 800 can include identifying, by a first device comprising a processor, a defined characteristic of an environment, wherein the defined characteristic is based on profile information associated with entities in the environment. For example, the defined characteristic can be temperature, sunlight, seat setting, ventilation setting or another aspect of an environment.

At 804, method 800 can include determining, by the first device, control information associated with concurrently providing preferences of the defined characteristic to the entities in the environment. For example, control information can be information generated about the parameters of the defined characteristic and/or the manner of the providing preferences about the defined characteristic to the entities in the environment. A first entity, for example, can prefer his/her seat to be tilted at a 45 degree angle while a second entity, for example, can prefer his/her seat to be tilted at a 30 degree angle. The specific preferred angles can be the preferences and the seat setting can be the defined characteristic. The method can determine information for causing each seat to be concurrently set to the preferred angle.

In other embodiments, information can be generated for concurrently providing preferred temperature or other environment characteristics to respective entities. The preferences can be determined based on the profile information associated with the preferences.

Figure 9:
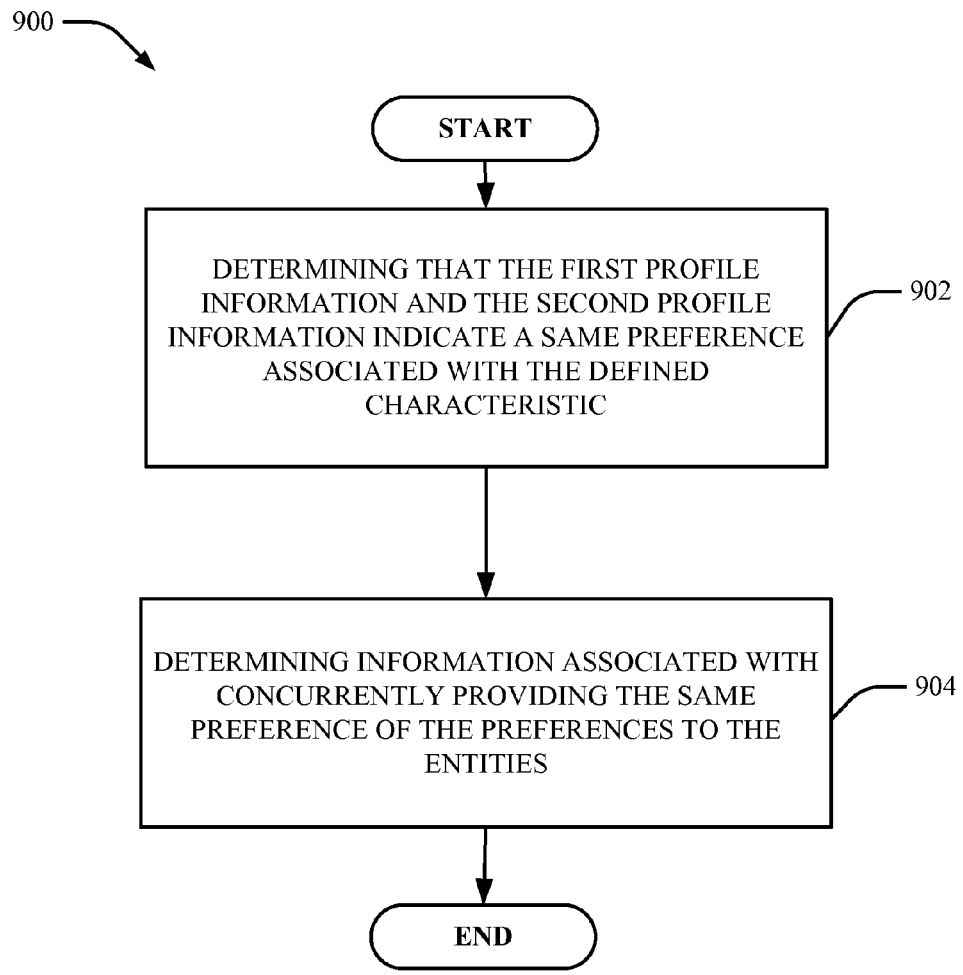

Turning now to FIG. 9, at 902, method 900 can include determining that the first profile information and the second profile information indicate the same preference associated with the defined characteristic. For example, both sets of profile information can indicate a preference for 75 degree temperature in the immediate environment of the entity. At 904, method 900 can include determining information associated with concurrently providing the preference of the entities.

Figure 10:
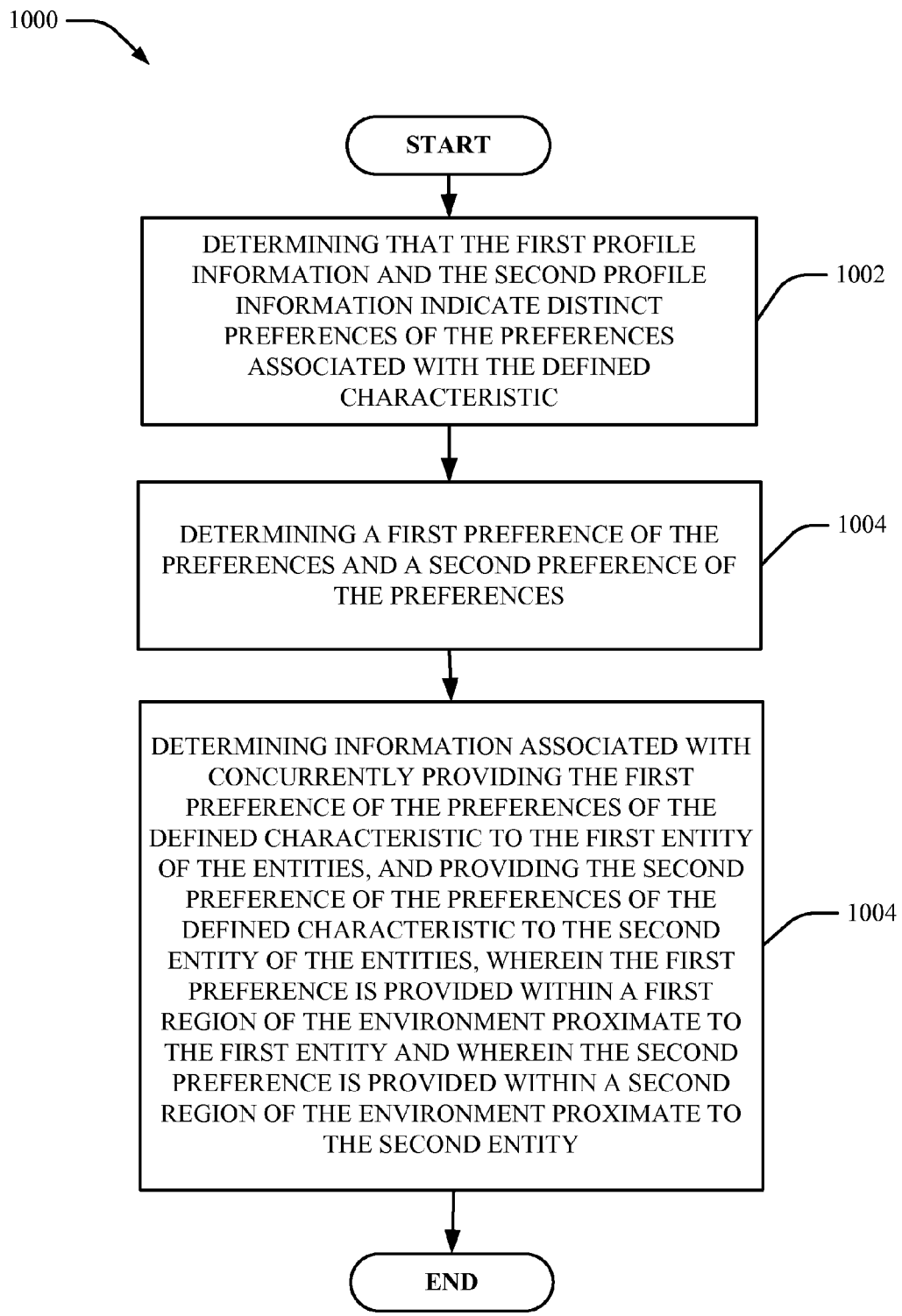

Turning now to FIG. 10, at 1002, method 1000 can include determining that the first profile information and the second profile information indicate distinct preferences associated with the defined characteristic. For example, a determination can be made that the preference are different through comparison of the preferences in the first profile information and the second profile information.

At 1004, method 1000 can include determining a first preference of the plurality of preferences and a second preference of the plurality of preferences. For example, the first profile information can indicate a preference for 75 degrees in the immediate environment of the first entity and the second profile information can indicate a preference for 68 degrees in the immediate environment of the second entity.

At 1006, method 1000 can include determining information associated with concurrently providing the first preference of the preferences associated with the defined characteristic to the first entity of the entities, and providing the second preference associated with the defined characteristic to the second entity of the entities. In various embodiments, the first preference is provided within a first region of the environment proximate to the first entity and the second preference is provided within a second region of the environment proximate to the second entity.

Figure 11:
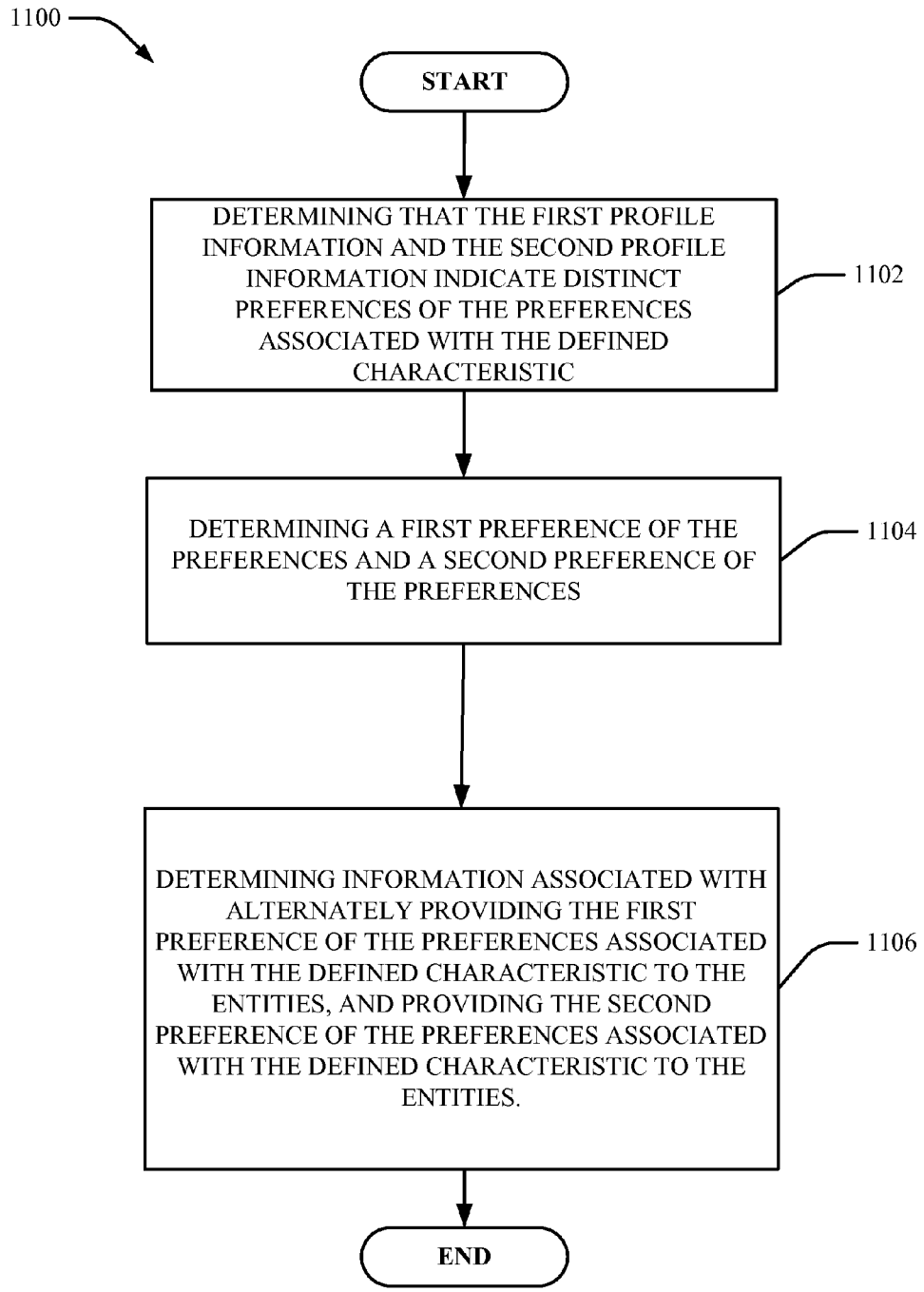

Turning now to FIG. 11, at 1102, method 1100 can include determining that the first profile information and the second profile information indicate distinct preferences associated with the defined characteristic. At 1104, method 1100 can include determining a first preference of the preferences and a second preference of the preferences.

At 1106, method 1100 can include determining information associated with alternately with providing the first preference of the preferences associated with the defined characteristic to the entities, and providing the second preference of the preferences associated with the defined characteristic to the entities. For example, in some embodiments, a determination can be made that different preferences for first and second entities cannot or should not be implemented in the regions of the first entity and the second entity concurrently. Various reasons can exist for determining that the distinct preferences will not be provided to both entities concurrently. As such, at 1106, method 1100 can determine that the first preference should be provided to each of the entities and then the second preference should be provided to each of the entities (or vice versa) alternately.

Figure 12:
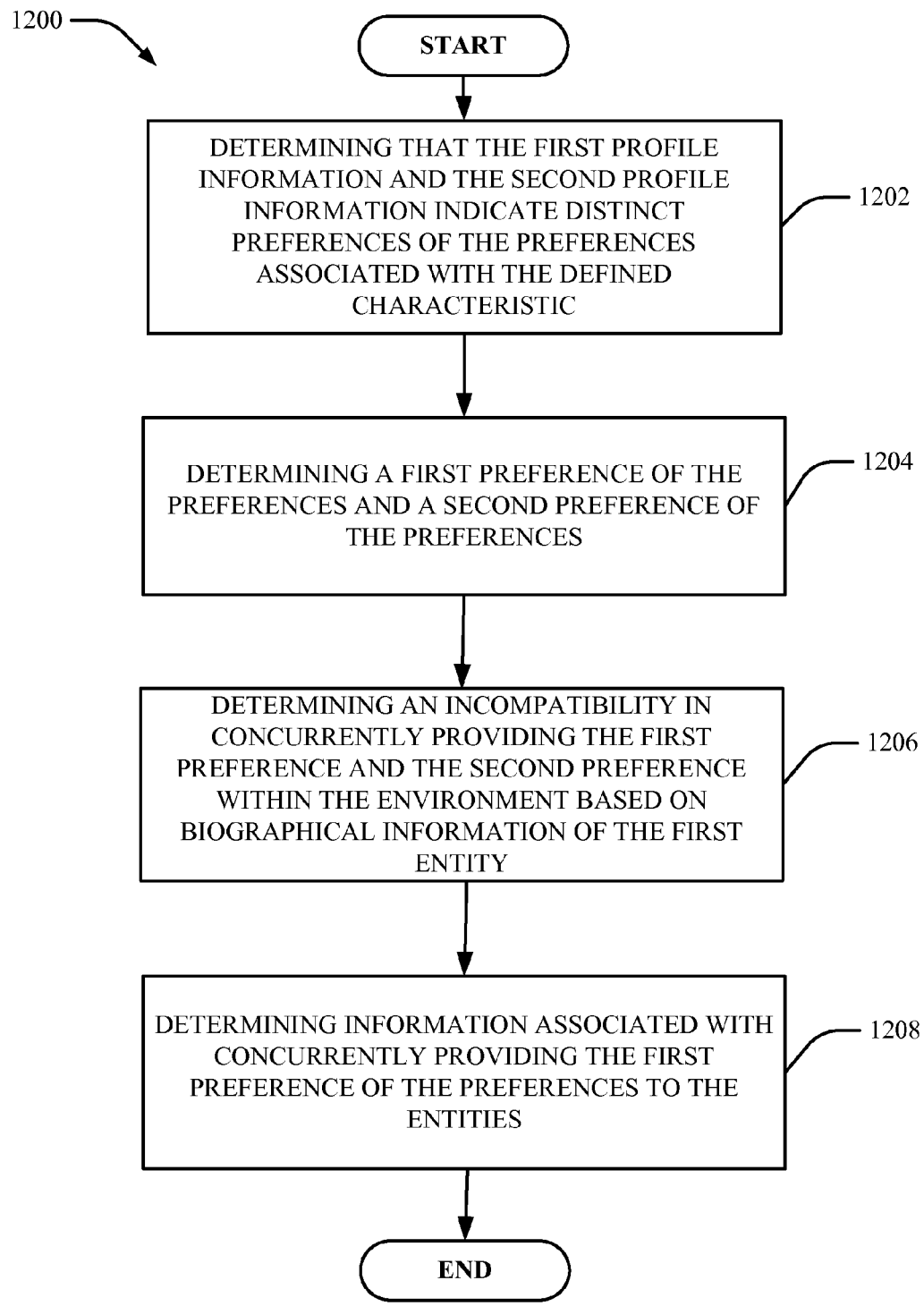

Turning now to FIG. 12, at 1202, method 1200 can include determining that the first profile information and the second profile information indicate distinct preferences of the preferences associated with the defined characteristic. At 1204, method 1200 can include determining a first preference of the preferences and a second preference of the preferences.

At 1206, method 1200 can include determining an incompatibility in concurrently providing the first preference and the second preference within the environment based on biographical information of the first entity. For example, the biographical information of the first entity can indicate that the first entity is a child while the second preference (indicated by the second entity) can be a preference for an environment not suitable for a child.

At 1208, method 1200 can include determining information associated with concurrently providing the first preference of the preferences to the entities. For example, the first preference of the child can be provided to the second entity and the first entity to provide an environment that is suitable to both entities (albeit not the preference of the second entity).

Figure 13:
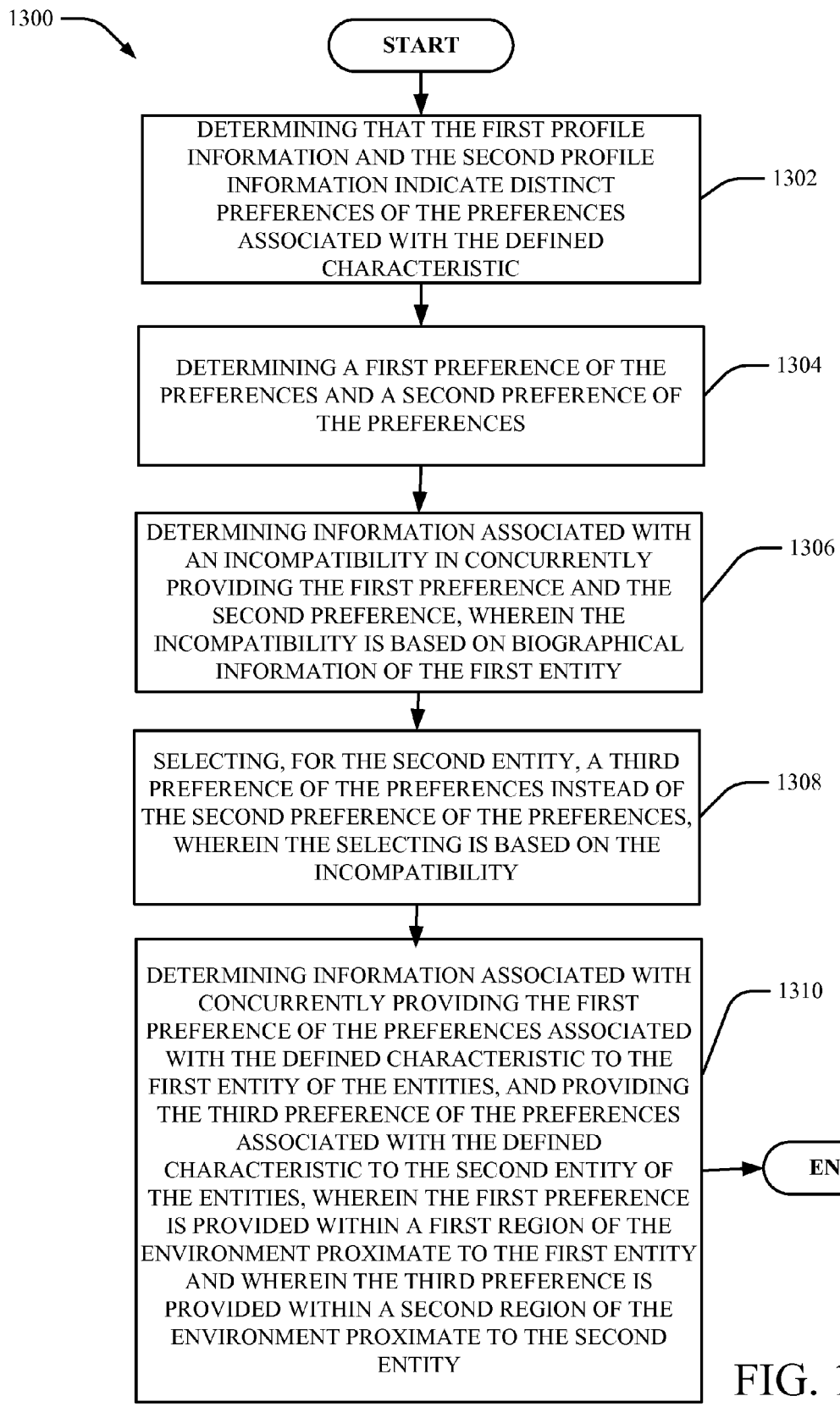

Turning now to FIG. 13, at 1302, method 1300 can include determining that the first profile information and the second profile information indicate distinct preferences of the preferences of the defined characteristic. At 1304, method 1300 can include determining a first preference of the preferences and a second preference of the preferences.

At 1306, method 1300 can include determining information associated with an incompatibility in concurrently providing the first preference and the second preference within the environment, wherein the determining is based on biographical information of the first entity. At 1308, method 1300 can include selecting, for the second entity, a third preference of the preferences instead of the second preference of the preferences, wherein the selecting is based on the incompatibility. Accordingly, as distinct from method 1200, in lieu of providing the preference of the first entity, method 1300, step 1306 can select a new preference suitable to both the first entity and second entity.

In some embodiments, for example, if the first entity indicates a first preference of hard rock music not suitable for a child, while the second entity indicates a first preference of classical music, and the second entity is a child, the method can select another preference altogether that is typically suitable for the first entity and the second entity. For example, the method can select a talk news station to be concurrently played in the first region and second region of first entity and second entity, respectively.

At 1310, method 1300 can include determining information associated with concurrently providing the first preference of the preferences of the defined characteristic to the first entity of the plurality of entities, and providing the third preference of the preferences of the defined characteristic to the second entity of the entities. The first preference can be provided within a first region of the environment proximate to the first entity and wherein the third preference is provided within a second region of the environment proximate to the second entity.

Although not shown, in another embodiment in which preferences are incompatible, a method can determine whether there are any other alternate preferences of music type that are the same as between the first entity and the second entity, and select the alternate preference. For example, if the first entity indicates hard rock music and jazz music and the second entity indicates classical music and jazz music, the method can select jazz music as an alternate preference. The method can then determine information such that the jazz music is concurrently played in the first region and second region of first entity and second entity, respectively.

Figure 14:
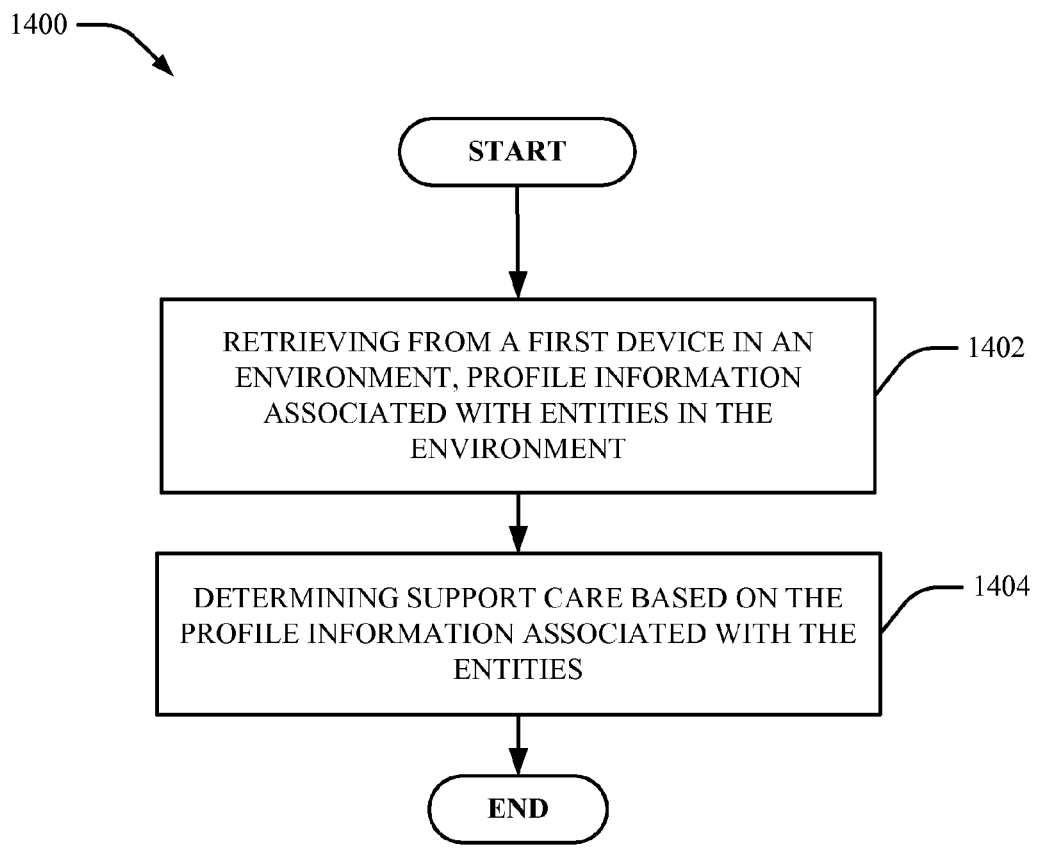

Turning to FIG. 14, at 1402, method 1400 can include retrieving from a first device in an environment, profile information associated with entities in the environment. The first device in the environment can be a device that has previously retrieved and/or stored profile information from entities in the environment in which the first device is associated. For example, the first device can be a device associated with, and that has retrieved information about, entities associated with a residence, a business, a vehicle or the like.

At 1404, method 1400 can include determining support care based on the profile information associated with the entities. In some embodiments, the support care can be emergency care. For example, the profile information retrieved from the first device can be evaluated to determine a number of different types of information. The types of information can include, but are not limited to, medical conditions or medical history of entities in the environment, biographical information of the entities and/or a number of entities in the environment.

Support care can be determined based on the profile information. By way of example, but not limitation, for example, profile information can indicate 23 entities associated with the environment. The number of entities can be compared to the number of entities retrieved from a burning building, for example. Based on the result of the comparison, a determination can be made that additional entities may be located inside of the building or have otherwise not been located.

As another example, the retrieval can be from a location remote from the environment (e.g., over a wireless channel). The profile information can indicate medical history or a medical condition (e.g., blood type, diabetic, heart condition patient). The method can include determining support care for one or more of the entities in advance of arrival at the environment. For example, a particular type of blood can be obtained in advance of arrival at the environment.

In various embodiments, method 1400 can be performed by any number of different electrical devices. For example, the devices can make the determination of resources regarding support care, retrieve profile information and the like.

Figure 15:
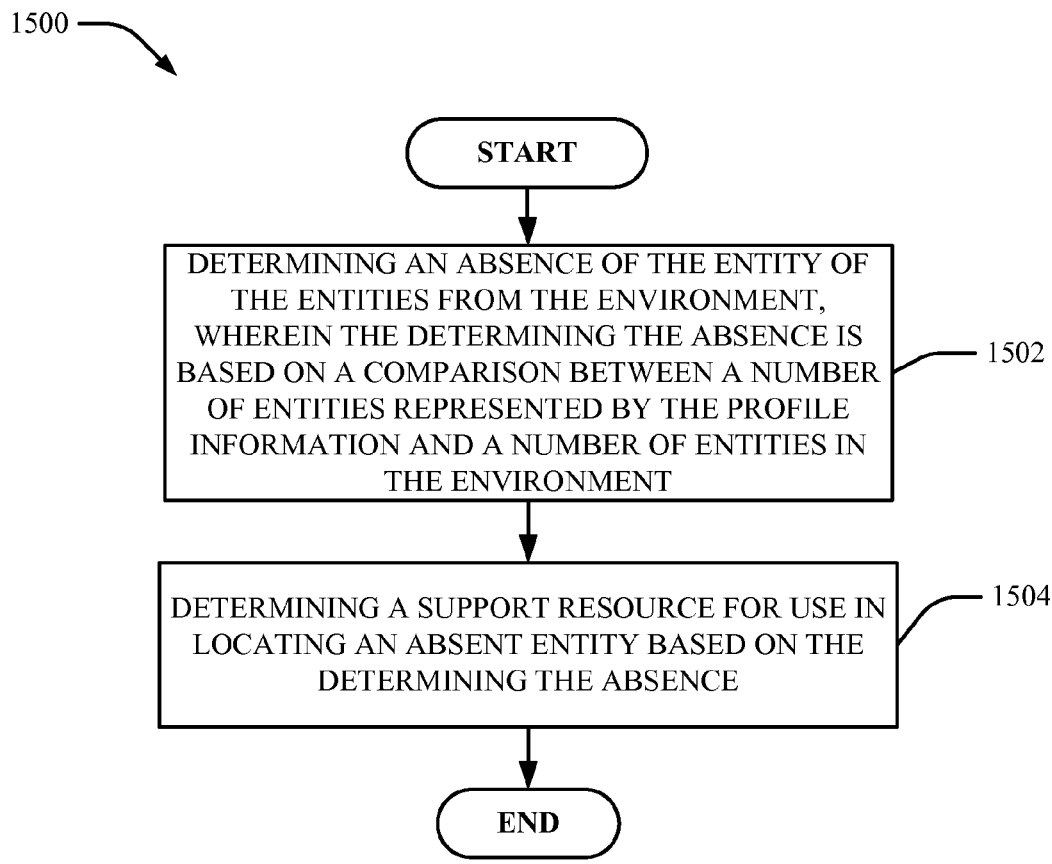

Turning now to FIG. 15, at 1502, method 1500 can include determining an absence of the entity of the entities from the environment, wherein the determining the absence is based on a comparison between a number of entities represented by the profile information and a number of entities in the environment. At 1504, method 1500 can include determining a support resource for use in locating the entity based on the determining the absence. Support resource can include, but is not limited to, medicine, equipment or the like.

Figure 16:
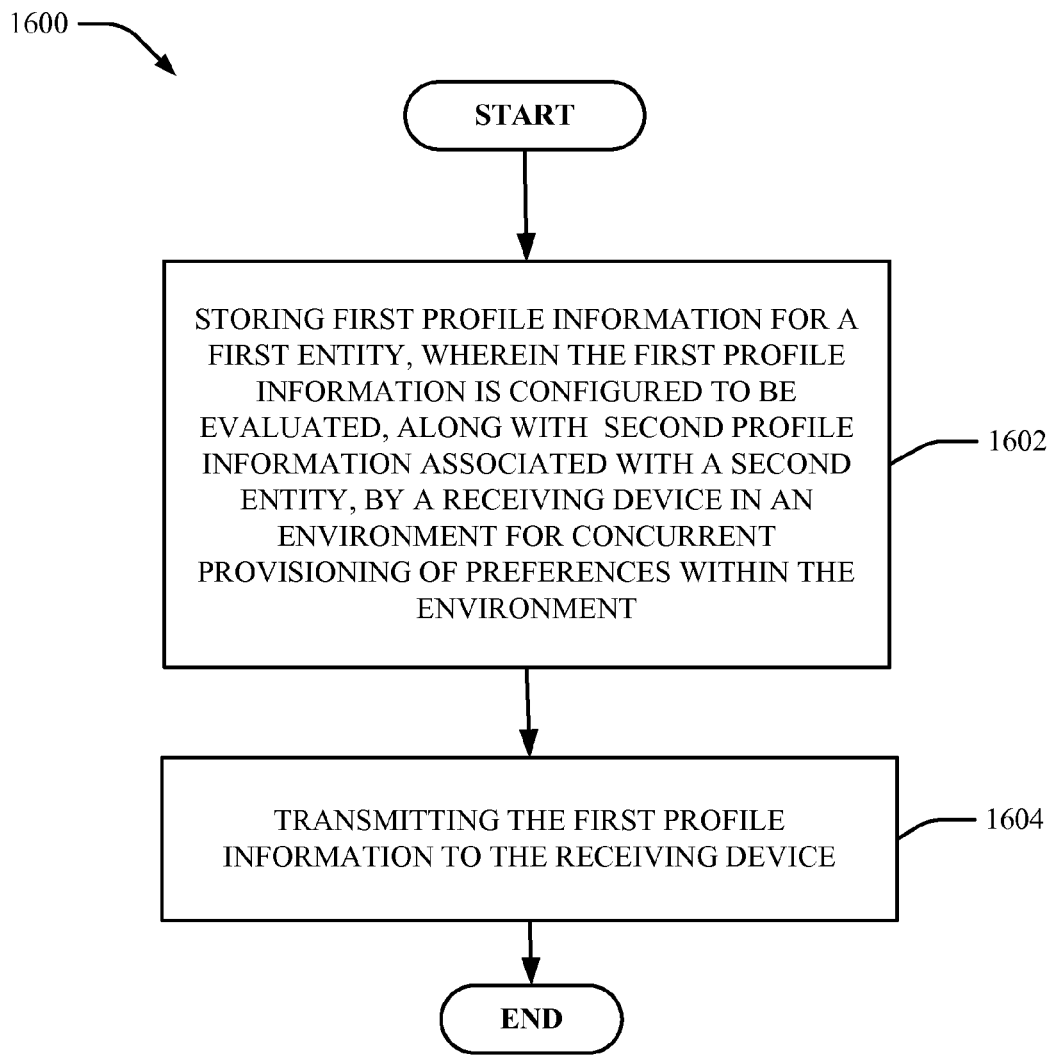

Turning now to FIG. 16, at 1602, method 1600 can include storing first profile information for a first entity, wherein the first profile information is configured to be evaluated, along with second profile information associated with a second entity, by a receiving device in an environment for concurrent provisioning of preferences within the environment. At 1604, method 1600 can include transmitting the first profile information to the receiving device.

Figure 17:
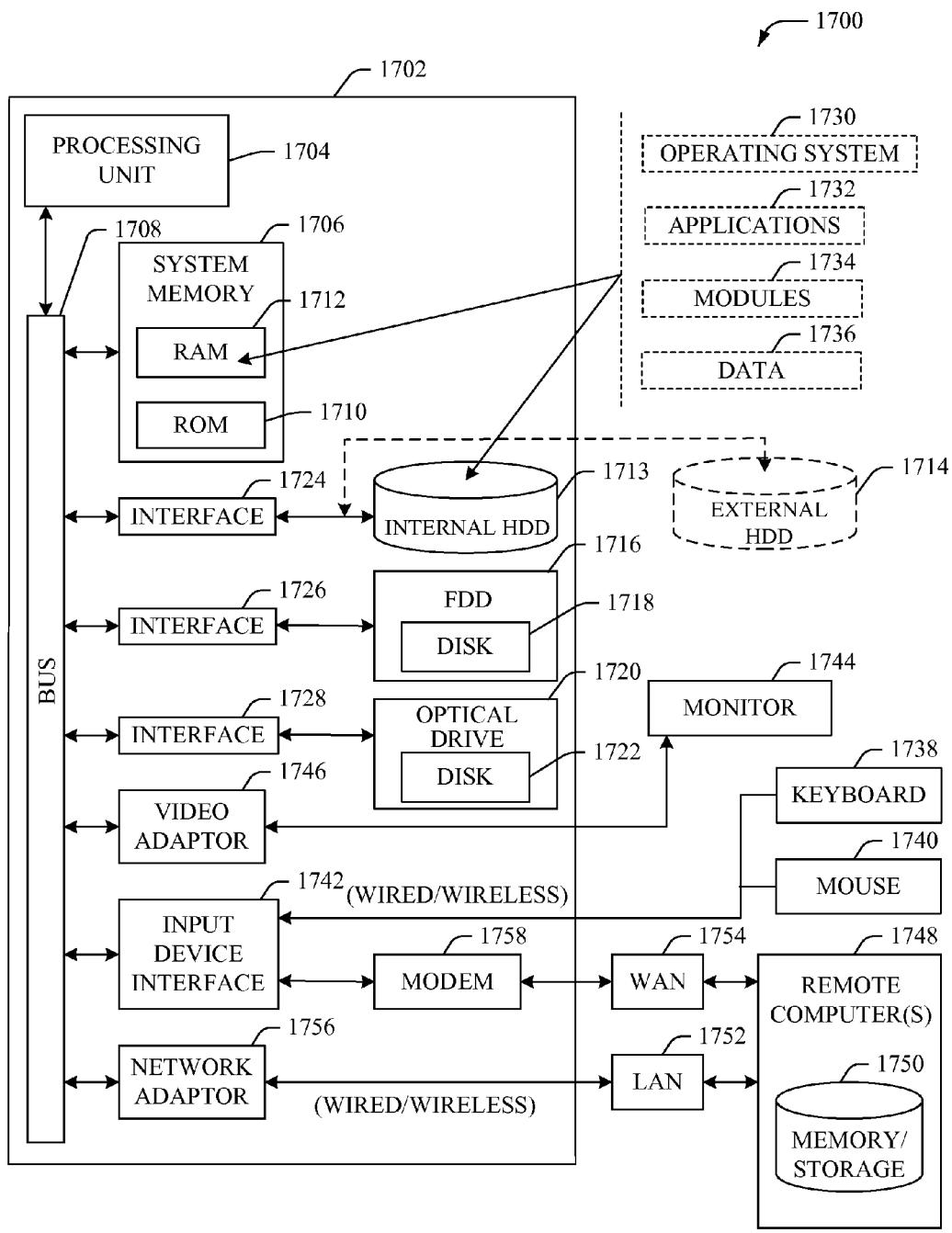
FIG. 17 illustrates a block diagram of a computer operable to facilitate content management based on profiles of members in an environment in accordance with one or more embodiments described herein.

FIG. 17 illustrates a block diagram of a computer operable to facilitate content management based on profiles of members in an environment in accordance with one or more embodiments described herein. For example, in some embodiments, the computer can be or be included within any number of components described herein including, but not limited to, device 102, device 104, device 204, multi-entity profile evaluation component 302, system control information component 304, environment determination component 404, profile information component 606, RFID component 604, support personnel multi-entity profile evaluation component 702 and/or support resource determination component 704.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the embodiments described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1713 (e.g., EIDE, SATA), which internal hard disk drive 1713 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface, respectively. The interface 1724 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

A mobile device can enter commands and information into the computer 1702 through one or more wired/wireless input devices, e.g., a keyboard 1738 and a pointing device, such as a mouse 1740. Other input devices (not shown) can include a microphone, an infrared (IR) remote control, a joystick, a game pad, a stylus pen, touch screen or the like. These and other input devices are often connected to the processing unit 1704 through an input device interface 1742 that can be coupled to the system bus 1708, but can be connected by other interfaces, such as a parallel port, an IEEE 1394 serial port, a game port, a universal serial bus (USB) port, an IR interface, etc.

A monitor 1744 or other type of display device can be also connected to the system bus 1708 via an interface, such as a video adapter 1746. In addition to the monitor 1744, a computer typically includes other peripheral output devices (not shown), such as speakers, printers, etc.

The computer 1702 can operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1752 through a wired and/or wireless communication network interface or adapter 1756. The adapter 1756 can facilitate wired or wireless communication to the LAN 1752, which can also include a wireless AP disposed thereon for communicating with the wireless adapter 1756.

When used in a WAN networking environment, the computer 1702 can include a modem 1758 or can be connected to a communications server on the WAN 1754 or has other means for establishing communications over the WAN 1754, such as by way of the Internet. The modem 1758, which can be internal or external and a wired or wireless device, can be connected to the system bus 1708 via the input device interface 1742. In a networked environment, program modules depicted relative to the computer 1702 or portions thereof, can be stored in the remote memory/storage device 1750. It will be appreciated that the network connections shown are example and other means of establishing a communications link between the computers can be used.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11(a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   identifying, by a first device comprising a processor, a defined characteristic of an environment, wherein the defined characteristic is based on profile information associated with entities determined to be in the environment;
   determining, by the first device, control information associated with providing preferences associated with the defined characteristic to the entities in the environment, wherein the profile information associated with the entities comprises first profile information associated with a first entity of the entities and second profile information associated with a second entity of the entities; and
   determining, by the first device, incompatibility information associated with an incompatibility with concurrently providing a first preference and a second preference of the preferences within the environment based on a first age of the first entity, wherein the second profile information associated with the second entity comprises a first numerical value associated with a second age of the second entity, and wherein the incompatibility is that the second entity has the second age of the first numerical value and that the first preference of the first entity is associated with a first broadcasting station device configured to broadcast content having subject matter typed as being inappropriate for first entities of the entities aged equal to the first numerical value of the second entity.

2. The method of claim 1, wherein the determining the control information comprises:
   determining that the first profile information and the second profile information indicate distinct preferences of the preferences associated with the defined characteristic;
   determining the first preference and the second preference;
   determining information associated with providing the first preference associated with the defined characteristic to the first entity of the entities; and
   providing the second preference associated with the defined characteristic to the second entity of the entities,
   wherein the first preference is provided within a first region of the environment proximate to the first entity and wherein the second preference is provided within a second region of the environment proximate to the second entity.

3. The method of claim 2, wherein the defined characteristic comprises a temperature of the environment.

4. The method of claim 1, wherein the determining the control information comprises:
   determining that the first profile information and the second profile information indicate a same preference associated with the defined characteristic; and
   determining preference information associated with concurrently providing the same preference to the entities.

5. The method of claim 1, wherein the determining the control information comprises:
   determining that the first profile information and the second profile information indicate distinct preferences of the preferences associated with the defined characteristic;
   determining the first preference and the second preference; and
   providing the second preference associated with the defined characteristic to the entities.

6. The method of claim 1, wherein the determining the control information comprises:
   determining that the first profile information and the second profile information indicate distinct preferences associated with the defined characteristic; and
   determining the first preference and the second preference.

7. The method of claim 6, further comprising:
   selecting, by the first device for the second entity, a third preference instead of the second preference, wherein the selecting the third preference is based on the incompatibility;
   determining, by the first device, preference information associated with providing the first preference associated with the defined characteristic to the first entity of the entities; and
   providing, by the first device, the third preference associated with the defined characteristic to the second entity of the entities,
   wherein the first preference is provided within a first region of the environment proximate to the first entity and wherein the third preference is provided within a second region of the environment proximate to the second entity.

8. The method of claim 1, further comprising:
   determining, by the first device, preference information associated with concurrently providing the first preference to the first entity and the second entity based on the incompatibility.

9. The method of claim 1, further comprising: determining, by the first device, the profile information based on external information received via a wireless channel between the first device and second devices associated with respective ones of the entities.

10. The method of claim 9, wherein the second devices comprise a radio frequency identification device associated with one of the entities.

11. The method of claim 1, further comprising: determining, by the first device, the profile information based on biometric information obtained from the entities.

12. The method of claim 1, wherein the defined characteristic comprises a temperature of the environment, wherein the determining the control information comprises determining a first temperature to be provided in a first region of the first entity of the entities and determining a second temperature to be provided in a second region of the second entity of the entities, and wherein the first temperature is to be provided in the first region concurrently with the second temperature being provided in the second region.

13. The method of claim 12, further comprising determining, by the first device, a defined level of sun tinting of a window in the first region of the environment to provide the first temperature in the first region and controlling the sun tinting to effect the defined level.

14. The method of claim 1, wherein the defined characteristic comprises broadcast information in the environment, and wherein the determining the control information comprises:
   determining a first preferred broadcast station device associated with the first entity of the entities, and determining a second preferred broadcast station device associated with the second entity of the entities; and determining that the first preferred broadcast station device is incompatible with the second entity based on biographical information of the second entity.

15. The method of claim 14, further comprising:

selecting, by the first device for concurrent broadcast in the environment to the first entity and the second entity, the second preferred broadcast station device, wherein the selecting is based on the first preferred broadcast station device being determined to be incompatible with the second entity.

16. The method of claim 1, further comprising:

selecting, by the first device, a second broadcasting station device different from the first broadcasting station device based on a determination that the second broadcasting station device is configured to broadcast content having second subject matter typed as being appropriate for the first entities of the entities aged equal to the first numerical value of the second entity and typed as being appropriate for third entities aged equal to a second numerical value of the first entity, wherein the first profile information comprises the second numerical value.

17. An apparatus, comprising:

a processor; and a memory that stores executable instructions that, when executed by the processor, facilitate performance of operations, comprising:

determining control information associated with providing preferences associated with a defined characteristic to entities in the environment, wherein the defined characteristic is based on profile information associated with the entities and comprises first profile information associated with a first entity of the entities and second profile information associated with a second entity of the entities; and determining incompatibility information associated with an incompatibility with concurrently providing a first preference and a second preference of the preferences within the environment based on a demographic of the first entity, wherein the demographic of the first entity comprises a first age, wherein the second profile information associated with the second entity comprises a first numerical value associated with a second age of the second entity, and wherein the incompatibility is that the second entity has the second age of the first numerical value.

18. The apparatus of claim 17, wherein the first preference of the first entity is associated with a first broadcasting station device configured to broadcast content having subject matter typed as being inappropriate for first entities of the entities aged equal to the first numerical value of the second entity.

19. An apparatus, comprising:

a processor; and a memory that stores executable instructions that, when executed by the processor, facilitate performance of operations, comprising:

storing first profile information for a first entity, wherein the first profile information is configured to be evaluated, along with second profile information associated with a second entity, by a receiving device in an environment to concurrently provide preferences to the first entity and the second entity within the environment, wherein the environment is a home environment, and wherein a lighting incompatibility has been determined between display of a first preference of the preferences for the first entity in the home environment and a concurrent display of a second preference of the preferences for the second entity in the home environment; and transmitting the first profile information to the receiving device.

20. The apparatus of claim 19, wherein the apparatus comprises a mobile telephone.

* * * * *